Jan. 7, 1969        J. V. KARDEL        3,420,417

DISPENSER FOR FLUID MATERIAL

Filed Oct. 12, 1966        Sheet __1__ of 3

INVENTOR.
JOHN V. KARDEL
BY Whittemore,
Hulbert & Belknap
ATTORNEYS

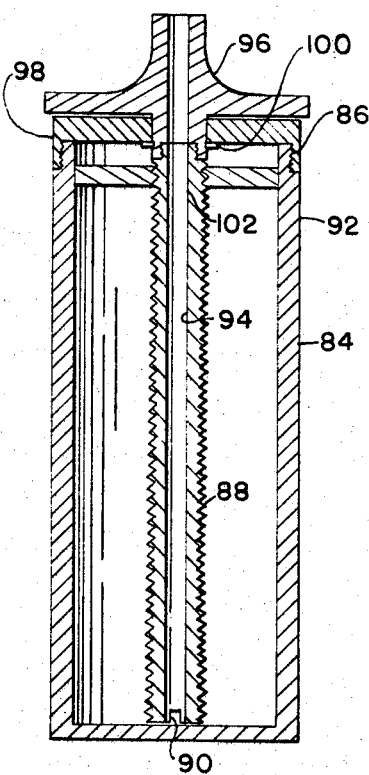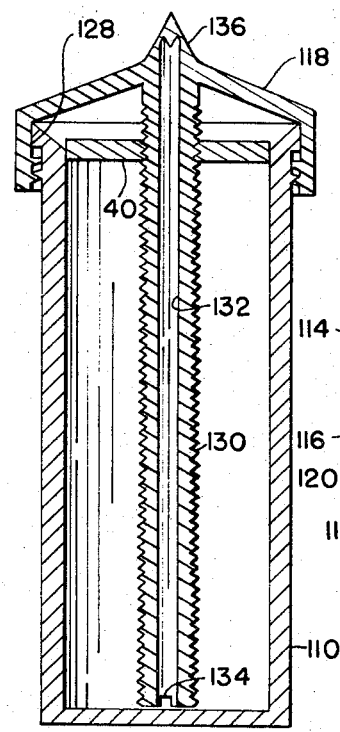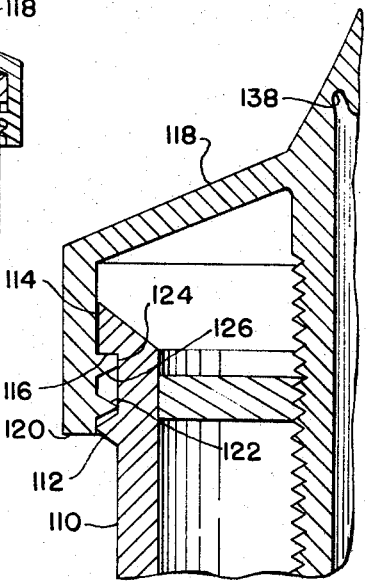

United States Patent Office 3,420,417
Patented Jan. 7, 1969

3,420,417
DISPENSER FOR FLUID MATERIAL
John V. Kardel, 906 St. Johns,
Wyandotte, Mich. 48192
Filed Oct. 12, 1966, Ser. No. 600,298
U.S. Cl. 222—390
Int. Cl. B67d 5/42
8 Claims

ABSTRACT OF THE DISCLOSURE

A dispensing cover and closure for throwaway containers of fluid material comprising a removable cap for the container rotatably carrying an exteriorly threaded tubular stem, a plunger threaded to said stem and movable longitudinally as a piston in said container, a manually engageable actuator fixedly connected to the stem to rotate it relative to the container, the cover having a skirt extending downwardly over the sides of the container substantially to its bottom.

---

It is an object of the present invention to provide a dispenser comprising an elongated cylindrical container, a cover for said container, a threaded stem rotatably carried by said cover and extending substantially to the bottom of said container, a plunger threaded to said stem, and means for preventing rotation of the plunger whereby rotation of the stem will force the plunger to the bottom of the container forcing fluid therein through the stem.

It is a further object of the present invention to provide a dispenser as described in the preceding paragraph in which the stem includes a laterally extending finger grip portion.

It is a further object of the present invention to provide a dispenser as described in the preceding paragraph in which the finger grip portion is separable from the stem and in which the stem includes a permanently formed shoulder thereon cooperable with the finger grip portion to prevent relative axial movement between the stem and cover.

It is a further object of the present invention to provide a dispenser as described in the foregoing in which the cover includes a skirt portion shaped to extend over and substantially completely conceal the disposable container.

Other objects and features of the invention will become apparent as the description proceeds, especially when taken in conjunction with the accompanying drawings, illustrating preferred embodiments of the invention, wherein:

FIGURE 8 is a vertical section through a somewhat different embodiment of the invention.

FIGURE 9 is a vertical section through yet another embodiment of the invention.

FIGURE 10 is an enlarged sectional view of the structure shown at the top of FIGURE 9.

Figure 12:
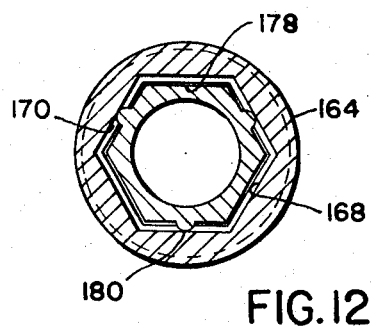
Figure 13:
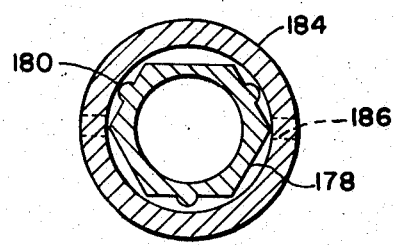

FIGURES 12 and 13 are greatly enlarged fragmentary section views on the line 12—12, and 13—13, respectively.

Figure 1:
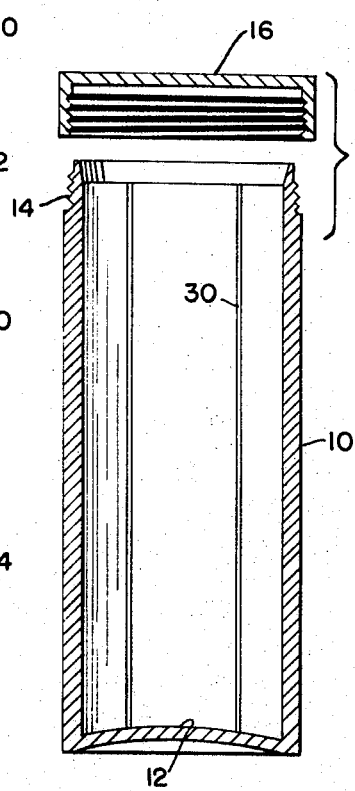
FIGURE 1 is an exploded longitudinally sectioned view showing a disposable container and a disposable cover therefor.

Referring first to FIGURE 1, the invention comprises a disposable rigid container 10 which conveniently may be formed of an inexpensive plastic material. The container is vertically elongated and may be of generally cylindrical configuration although if preferred, its cross-section may be transversely elongated. The bottom wall 12 of the container is preferably upwardly curved as shown, and it is provided at its upper end with screw threads as indicated at 14. The disposable container when sold is provided with a disposable cover 16 threaded for cooperation with the threads 14. The cover 16 may also be formed of inexpensive plastic material.

Figure 2:
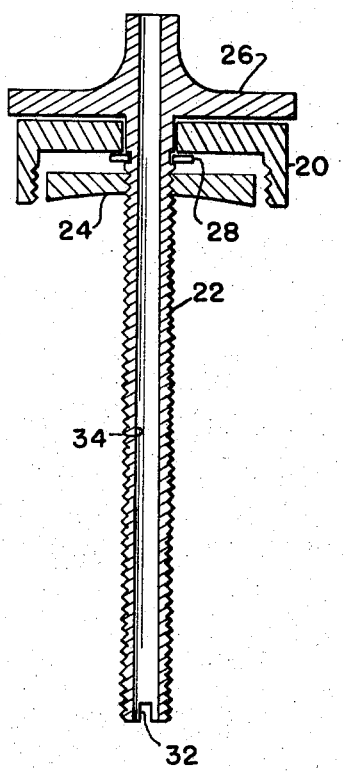
FIGURE 2 is a longitudinally sectioned view through a combined cover and dispensing device intended for use with a series of disposable containers.
Figure 6:
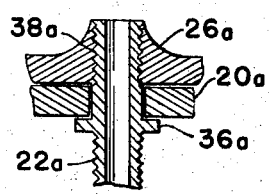
FIGURE 6 is a fragmentary sectional view showing a modification.

It is contemplated that a permanent cover and dispensing device shown separately in FIGURE 2 will be provided and will be associated throughout its life with a series of disposable containers. The cover and dispensing device comprises a screw threaded cover member 20, an externally threaded tubular stem 22 rotatably carried by the cover 20, and a plunger 24 threaded to the stem. At its upper end the stem includes an actuating portion 26 which may be gripped by the fingers of the user. The finger piece 26 may be integrally formed as seen in FIGURE 2, or it may be threaded to a threaded exterior portion of the stem as indicated in FIGURE 6. As best seen in FIGURE 2, the stem is rotatable relative to the cover 20 by virtue of a snap ring 28 received in a groove formed in the stem, the snap ring and finger portion 26 constituting abutments which permit rotation of the stem 22 relative to the cover 20 but prevent longitudinal movement thereof.

Means are provided for preventing rotation of the plunger 24 and these means may constitute elongated ribs 30 formed at the interior of the container, or equivalent vertically extending ribs formed at the outer edge of the plunger 24. Of course, it will be understood that if the container 10 is of non-circular configuration, no special provision is required to maintain the plunger 24 against rotation.

In use the plunger 24 operates as a piston within the container when the stem is rotated and upon downward movement, fluid is displaced from the container through one or more lateral openings 32 provided at the extreme lower end of the stem, thus substantially the entire contents of the container may be dispensed through the longitudinal opening 34 in the stem 22 by appropriate rotation of the finger piece 26.

Where the finger piece is separately removable from the stem, as suggested in FIGURE 6, the use of the snap ring 28 may be avoided and the stem may be provided with an integral flange 36a. In this case the finger piece 26a is shown as threaded to the upper end of the stem 22a by threads indicated at 38a, and the cover 20a is thus relatively rotatable to the stem but relative longitudinal movement therebetween is prevented.

Figure 3:
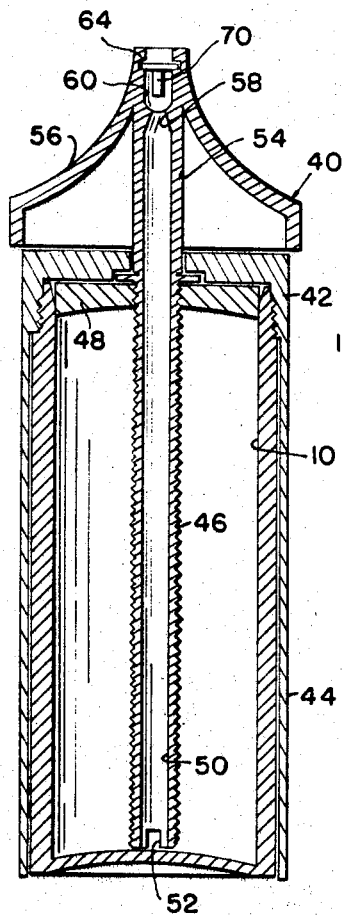
FIGURE 3 is a vertical section through a dispenser constructed in accordance with the present invention.

Referring now to FIGURE 3 there is shown the assembly of a container 10 with a combined cover and dispensing device indicated generally at 40 which is generally similar to that shown in FIGURE 2 but differs in some respects. It will be noted that the cover member 42 is provided with a depending skirt 44 which covers and completely conceals the disposable container 10. With this arrangement it is of course possible to employ a highly decorative and relatively expensive permanent dispensing cover, since it will be used for an extended period with a series of disposable containers. In this case the stem 46 is exteriorly threaded as before and cooperates with the non-rotatable piston-like plunger 48 which is caused to move down upon rotation of the stem to dispense fluid through the hollow interior 50 of the stem through the lateral openings 52 at the bottom thereof.

In this case the upper end of the stem as indicated at 54 is upwardly extended and associated with a decorative finger grip portion 56.

Figure 4:
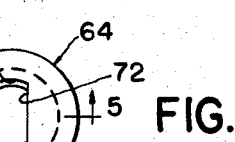
FIGURE 4 is an enlarged plan view of a self-sealing closure employed in the present invention.
Figures 5, 7:
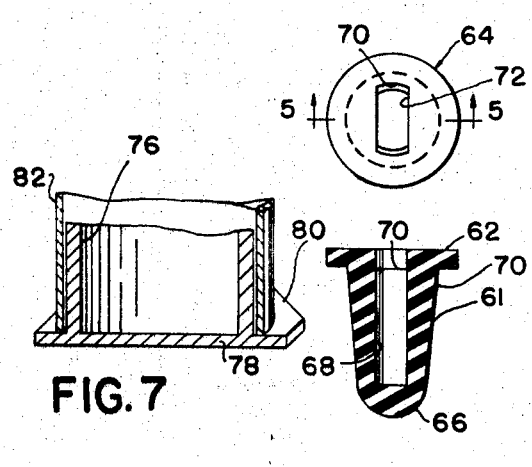
FIGURE 5 is a section on the line 5—5, FIGURE 4.
FIGURE 7 is a fragmentary view illustrating a differently shaped container.

In this embodiment of the invention there is shown a self-sealing closure at the upper end of the stem. For this purpose the passage 50 at the upper end of the stem is restricted as indicated at 58 to provide an upwardly facing valve seat which opens into a chamber 60 thereabove. Located in the chamber 60 is a self-sealing dispensing valve 61, details of which are best seen in FIGURES 4 and 5. This valve includes a radial flange 62 seated in a corresponding annular groove 64 provided at the upper end of the stem. The valve 61 is formed of a resilient material such as rubber, and is dimensioned so that when positioned as shown in FIGURE 3, its lower rounded end 66 engages the valve seat formed by the reduced portion 58. The interior of the valve 61 is hollow as indicated at 68 and opens laterally as indicated at 70 to provide for passage of fluid material from the chamber 60 to the hollow interior of the valve from which it is dispensed through the elongated slot 72 best seen in FIGURE 4. Operation of the valve is fully automatic. When pressure is applied thereto by fluid material in the hollow passage 50, the valve is distorted so that fluid flows through the valve and thence through the lateral port 70 into its hollow interior, and finally, outwardly through the transverse slot at its upper end.

Reference has been made in the foregoing to a fluid material contained in the container. Material of this type may for example be toothpaste or any creaming material such for example, cold cream, anti-perspirant, shaving cream, or the like. Alternatively, the container may contain liquid such for example as shaving lotion, hand lotion, liquid deodorants, and the like.

In either case, downward movement of the plunger 24 or 48 forces the fluid material downwardly into the lower end of the stem and thence upwardly through its exposed upper end. In the case of a liquid, the operation of dispensing the liquid may involve imparting a predetermined rotation to the stem, thereby displacing a predetermined quantity of liquid past the valve seat into the chamber 60 and into the interior of the valve element 61. This material flows from the chamber and interior of the valve when the dispenser is inverted.

In any case, the dispensing device is never subjected to air binding since as the plunger 24 or 48 moves downwardly, air enters the interior of the container through the central opening in the cover 20 or 42.

In FIGURE 7 there is illustrated a somewhat different embodiment of the invention, generally similar to the construction of FIGURE 3. In this case the container 76 is provided with a flat base 78 including a laterally extending flange portion 80 herein illustrated as of polygonal form. The side walls of the container 76 are of course cylindrical and a depending skirt 82 of cylindrical configuration and similar to the skirt 44 of FIGURE 3, is provided.

Referring now to FIGURE 8 there is illustrated a somewhat different embodiment of the present invention. In this case the container 84 has a recessed threaded portion 96 at its upper end and is provided interiorly with the elongated tubular stem 88 having lateral ports 90 at its bottom and adjacent its upper end carrying a piston element 92 threaded to the stem 88. Suitable means, as previously described herein, are provided for preventing relative rotation between the piston 92 and the container 84, so that upon rotation of the threaded stem 88, the piston 92 moves downwardly and expels fluid contents of the container 84 through the passage 94 in the stem and out through an actuating nozzle 96 at the upper end of the container. The dispensing nozzle 96 has a cover 98 rotatably connected thereto by suitable means such for example as the snap ring 100 providing for rotation between the nozzle 96 and the cover 98. The nozzle 96 at its inner end is recessed and threaded as indicated at 102 for engagement with the correspondingly reduced threaded upper end of the stem 88.

With this arrangement the container 84 may be sold filled with fluid material such for example as toothpaste and containing the stem 88 and piston 92. A plain threaded cap will be provided which may be removed and replaced by the cover 98 and the dispensing nozzle 96. With this arrangement the cap 98 is threaded to the upper end of the container 84 and at the same time the relatively rotatable dispensing nozzle 96 may be threaded into a firm driving connection with the threaded stem 88.

Referring now to FIGURES 9 and 10 there is illustrated yet another embodiment of the present invention. In this case the container 110 is provided at its upper end with a short helical thread 112 spaced an appreciable distance from an upper flange 114, the lower surface 116 of which is a flat circular flange. Associated with the container 110 is a dispensing cap or cover 118 having a skirt 120 provided adjacent its lower end with a short threaded portion 122 cooperable in threaded engagement with the threaded portion 112 of the container. At the interior surface of the skirt 120 there is provided an annular abutment ring 124, the upper surface of which is a flat annular surface engageable in full surface-to-surface contact with the downwardly facing flat annular surface 116 of the flange 114.

With this arrangement the dispensing cap or cover 118 may be pressed over the upper end of the container 110, the inclined surfaces of the thread 122 and the lower inclined surface 126 of the flange 124 cooperating in a camming action to spread the cap to permit its thread and flange structure to snap over the flange 114 of the container 110. The cap or closure 118, for this purpose is formed of suitable slightly yieldable resilient material such for example as commercially available plastic.

Having snapped the cover or cap 118 over the flange 114 of the container, it may then be rotated to bring about threaded engagement between the threads 112 and 122 to provide for screwing of the cap 118 downwardly so that it seals tightly against the upper edge surface of the container 110. For this purpose the upper surface of the container is preferably beveled as indicated at 128, particularly if the cap 118 is flat.

Preferably, integrally associated with the cap 118 is a threaded tubular stem 130 having an interior passage 132 extending therethrough, communicating by means of the lateral ports 134 with the interior of the container. At its upper end the cap and stem unit is provided with an integral closure portion 136 which is of reduced wall thickness as indicated at 138, so that the tip portion 136 may be broken off or cut off to provide for dispensing the fluent material through the passage 132. As in all embodiments of the present invention, the construction includes a piston 140 threadedly engaged with the stem 130 and movable downwardly by rotation of the stem while the piston is held against rotation within the container 110.

With the construction illustrated in FIGURES 9 and 10 it will of course be appreciated that when the cap 118 is turned in a direction to unscrew the threads 112 and 122, the position illustrated in FIGURE 10 is assumed and removal of the cap is prevented by engagement of the flat radial surfaces between the flanges 114 and 124. At this time the threads 112 and 122 may be completely out of engagement as indicated in FIGURE 10, at which time the cap 118 may be freely rotated, thus forcing the paste or other material out of the container. After the required amount has been dispensed, the cap may be pressed inwardly slightly to engage the threads and given a slight further rotation to again bring the cap or cover into the sealing relationship illustrated in FIGURE 9.

The hand of the threads 112 and 122 may be related to the hand on the threads on the threaded stem such that rotation of the cap or cover 118 in a direction opposite to the rotation required to dispense material from the container, is effective to move the cap or cover into sealing relation with the container.

Figure 11:
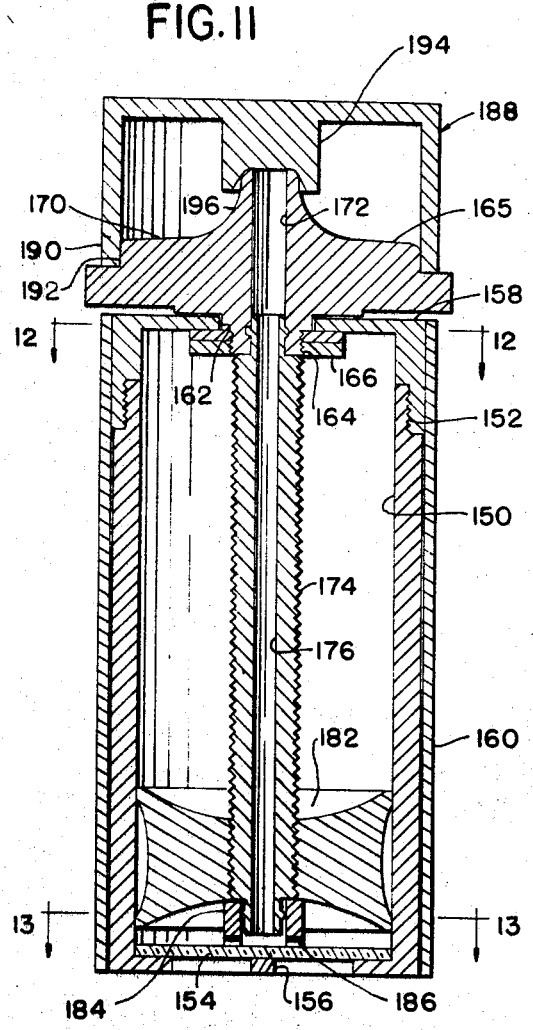
FIGURE 11 is a vertical section through a modified form of dispenser assembly.

Referring now to FIGURES 11–13, there is illustrated a further refined embodiment of the invention. A disposable container 150 is provided adjacent its top with a reduced screw threaded portion 152. While its bottom wall may be integral with its side walls, a separate bottom wall 154 is illustrated which may be transparent. Secured to the bottom of the container is a rib 156 by means of which the operator can rotate the container in order to remove it from the assembly.

A removable cover 158 is provided which has its lower end threaded for engagement with the reduced threaded portion 152 of the container. Secured to the cover 158 is a cylindrical decorative sleeve or skirt 160. The cover 158 is provided with a central opening 162 through which extends a reduced threaded projection 164 of a rotatable actuator 165 adapted to receive clamping nuts 166. The shoulder of the actuator 165 above the reduced threaded extension 164 is engaged by the nuts and retains the actuator 165 for relatively free rotation.

As best seen in FIGURE 12, the reduced threaded extension 164 of the actuator is provided with a non-circular recess 168 at its lower end, illustrated herein as of hexagonal form. The recess is further provided with a channel 170. Above the hexagonal recess 168, the actuator 165 is provided with a vertical passage 172 which may be cylindrical in shape.

A threaded stem 174 is provided having a through opening or passage 176 therein. The stem 174 is provided with identical configuration at opposite ends to permit reversal of the stem as will subsequently be described. The threaded stem includes a reduced non-circular portion 178 which conforms to the non-circular opening 168 so that rotation of the actuator 165 will result in rotation of the threaded stem 174. This reduced non-circular end portion of the threaded stem is further provided with a plurality of small projections 180 which snap into the channel 170 so as to interlock the threaded stem and rotatable actuator 165.

Threadedly connected to the stem 174 is a piston 182 which is here shown as reversible for a purpose which will subsequently be described. The piston 182 has frictional contact with the inner wall of the container 150 so as to prevent rotation thereof, and if desired or necessary in a particular application, the inner surface of the container 150 may be provided with a vertical rib adapted to be received in a vertical groove at one edge of the piston 182.

Carried by the bottom wall 154 of the container 150 is a socket member 184 which is adapted to rotatably receive the lower reduced end portion of the threaded stem 174. The details of this construction are best illustrated in FIGURE 13 where it will be seen that the socket member 184 is provided with radial openings 186 to permit flow of paste or other fluid material into the interior of the socket and thence into the passage 176 provided in the stem 174. It will be observed that the hexagonal end portion 178 of the stem is rotatable in the cylindrical interior of the socket member 184. The socket member 184 may be integral with the bottom wall of the container, which in turn, as previously described, may be integral with the side walls thereof. Alternatively of course, the socket member 184 may be a separate element and may include a cylindrical skirt which fits closely within the interior of the container to insure central location of the socket portion thereof.

With the construction as so far described it will be apparent that the operator may hold the skirt 160 in his hand and rotate the actuator 165 with his thumb. The skirt 160 supports the container 150 against rotation through cover 158 and rotation of the actuator 165 effects rotation of the threaded stem 174. The piston 182 which is prevented from rotating by its engagement with the container 150, is thus caused to move vertically within the container 150. Downward movement of the piston causes the paste or other fluid material to flow inwardly through ports 186 and thence upwardly through the passages 176 and 172.

Substantially all of the paste or other fluid material will have been dispensed. At this time the substantially empty container 150 may be removed by unscrewing it from the cover 158. Thereafter, the piston and threaded stem 174 may be detached as a unit by applying a direct pull to cause the projections 180 to be resiliently displaced inwardly and to move out of the retaining groove or channel 170. Thereafter, the threaded stem and piston as a unit may be reversed and the opposite end of the stem inserted in the recess 168, thus repositioning the piston adjacent the actuator 165.

The dispensing unit is provided with a cap 188 having a flange 190 which fits in an annular recess 192 provided on the actuator 165. If desired, the cap may be threaded for cooperation with the actuator. At its interior the cap 188 includes a projection 194 shaped to engage over the upper end of a nozzle-shaped portion on the actuator 165. For this purpose the projection 194 may if desired be formed of a yieldable material and attached to the cap 188, rather than being formed as an integral part thereof as illustrated in the figure.

With the described construction the user of the container may grip the container in one hand and rotate the actuator with his thumb a predetermined distance to cause a measured quantity of paste or other fluid material to be expelled. It is usually desirable for the operator to then reverse rotation of the actuator a slight distance, thus reversing movement of the piston in the cylinder and drawing the paste or other fluid material downwardly from the extreme end of the nozzle-shaped portion.

In order to facilitate measured dispensing of material, it is desirable for the flange on the actuator to be non-circular. By providing for example, a hexagonal or octagonal shape to the flange, and particularly by recessing the sides thereof, it is possible to provide a predetermined angular rotation thereof in the simplest manner.

The drawings and the foregoing specification constitute a description of the improved dispenser in such full, clear, concise and exact terms as to enable any person skilled in the art to practice the invention, the scope of which is indicated by the appended claims.

What I claim as my invention is:

1. A dispenser comprising an elongated rigid, cylindrical container having a flat bottom and open top, a removable cap for direct attachment to said container, a threaded tubular stem rotatably carried by said cap and extending through said cap to the bottom of said container and having lateral ports at its bottom end, a piston movable vertically in said container and threaded to said stem, means effective to prevent rotation of said piston in said container, and a manually engageable actuator at the top of said container connected to said stem for rotating it to dispense fluent material upwardly through said tubular stem, said cap including a depending skirt covering the sides of said container substantially to the bottom thereof, said actuating member and cap being integral, first means on said cap and container engageable to provide for rotation but to prevent separation therebetween, and additional threaded means on said cap and said container selectively engageable to provide for sealing engagement of said cap on said container, said first means comprising cooperating retaining flanges on said cap and container, said cap being distortable to snap its retaining flange over the retaining flange of said container.

2. A dispenser comprising an elongated cylindrical container, a cover for said container directly attachable thereto and having a central opening, a threaded tubular stem having its upper portion rotatably extending through the opening in said cover, its lower portion extending to the bottom of said container and an internal stop abutment immediately below said cover, a plunger movable as a piston in said container and threaded to said stem, and a removable actuator connected to said stem immediately above said cover, said actuator and stop abutment connecting said stem to said cover for relative rotation while preventing relative axial movement therebetween, said threaded stem having its opposite end portions shaped for detachable engagement with said actuator so that when the plunger has been moved to adjacent one end of the stem, the stem may be separated from the actuator and its opposite end connected thereto, thus repositioning the plunger with reference to the actuator.

3. A dispenser as defined in claim 2 in which the bottom wall of the container is provided with a socket member for the reception of the lower end of said threaded stem.

4. A dispenser as defined in claim 3 in which said socket member is provided with passage means to provide for flow of fluid material into the socket member.

5. A dispenser as defined in claim 2, said cover having a depending skirt extending substantially to the bottom of said container and concealing said container.

6. A dispenser as defined in claim 5, said container having a finger grip on its base to provide for rotation of said container to detach said container from the assembly of the cover, actuator, stem and plunger.

7. A dispenser as defined in claim 5 in which said actuator extends radially outwardly to a position in which its periphery may be engaged by the thumb of an operator holding the depending skirt of the cover in his hand.

8. A dispenser comprising an elongated cylindrical container, a cover for said container directly attachable thereto and having a central opening, a threaded tubular stem having its upper portion rotatably extending through the opening in said cover, its lower portion extending to the bottom of said container and an internal stop abutment immediately below said cover, a plunger movable as a piston in said container and threaded to said stem, and a removable actuator connected to said stem immediately above said cover, said actuator and stop abutment connecting said stem to said cover for relative rotation while preventing relative axial movement therebetween, said threaded stem having its opposite end portions shaped for detachable engagement with said actuator so that when the plunger has been moved to adjacent one end of the stem, the stem may be separated from the actuator and its opposite end connected thereto, thus repositioning the plunger with reference to the actuator, said detachable connection between the actuator and threaded stem comprising an annular channel in a non-circular recess at the lower end of said actuator, and correspondingly non-circular reduced end portions on said stem including projections resiliently receivable in said channel.

References Cited

UNITED STATES PATENTS

| | | | |
|---|---|---|---|
| 1,472,123 | 10/1923 | Heinitsh et al. | 222—390 X |
| 2,799,881 | 7/1957 | Howe | 222—390 X |
| 2,627,365 | 2/1953 | Gabler | 222—326 |
| 3,246,804 | 4/1966 | Fuhrmann | 222—183 |

STANLEY H. TOLLBERG, *Primary Examiner.*

U.S. Cl. X.R.

222—541